July 7, 1931.  R. WATSON  1,813,648
INSECT EXTERMINATOR
Filed Sept. 9, 1930
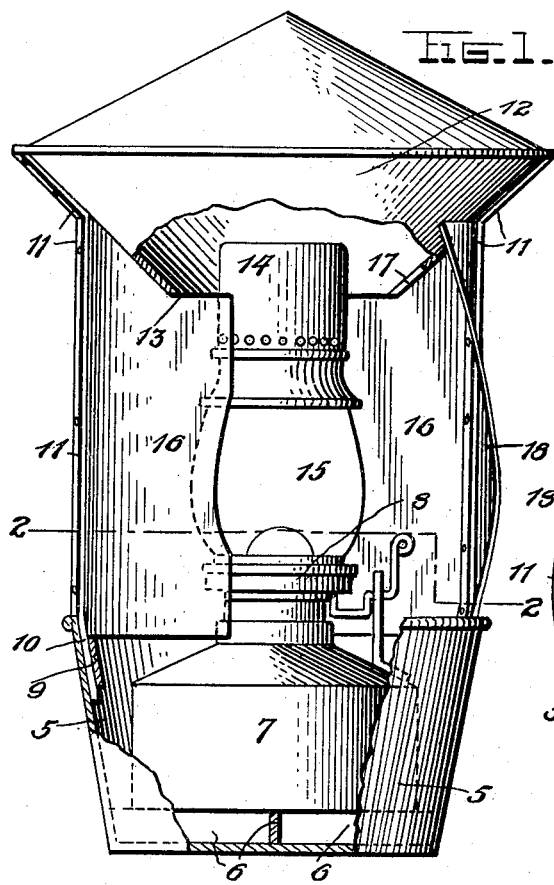
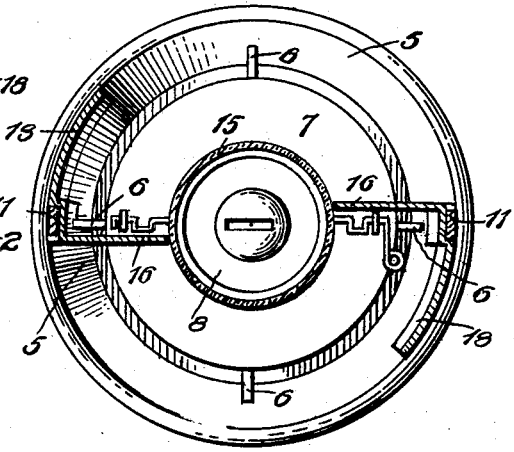
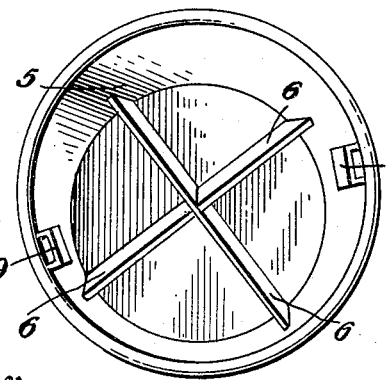
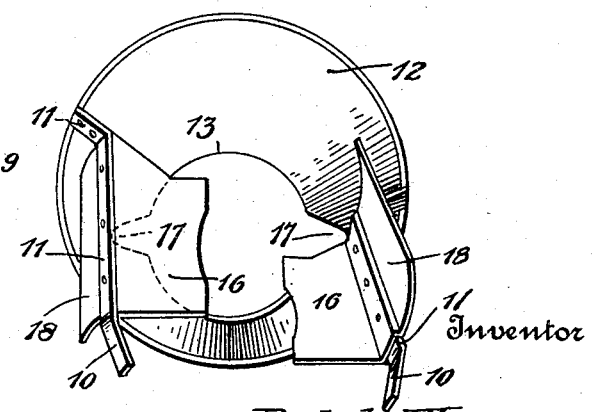
Inventor
Ralph Watson Patented July 7, 1931

1,813,648

UNITED STATES PATENT OFFICE

RALPH WATSON, OF VILLA RIDGE, ILLINOIS

INSECT EXTERMINATOR

Application filed September 9, 1930. Serial No. 480,739.

The invention relates to insect exterminating devices of the lantern type, and it aims to provide a rather simple and inexpensive device of this character, yet one which will be exceptionally efficient, serving to kill any attracted insects either by burning (if they ascend) or by drowning (if they descend).

With the foregoing in view, the invention resides in the novel subject matter hereinafter described and claimed, description being accomplished by reference to the accompanying drawings.

Fig. 1 is a side elevation partly broken away and in section.

Fig. 2 is a horizontal sectional view on line 2—2 of Fig. 1.

Fig. 3 is a perspective view of the liquid-containing pan.

Fig. 4 is a perspective view of the drum and the insect-guiding plates carried thereby.

The preferred construction has been illustrated and will be specifically described, with the understanding however that within the scope of the invention as claimed, variations may be made.

The numeral 5 denotes an open top pan to contain a liquid, the bottom of said pan being provided with upstanding flanges 6 to support the oil pot 7 of a lantern 8, the pan being of considerably greater diameter than the oil pot, to allow insects to descend into said pan to be drowned in the contained liquid.

At suitable locations, the side wall of the pan 5 is provided with upwardly opening sockets 9 which receive the lower ends 10 of vertical leg-forming bars 11. The upper ends of these bars are secured to a double cone drum 12, said drum having an opening 13 in its bottom, of greater diameter than the cap 14 upon the upper end of the lantern globe 15. This opening 13 permits insects to fly or crawl upwardly into the drum 12, in which they are burned to death, the dead insects falling through said opening and into the pan 5.

Vertical plates 16 extend between the pan 5 and the drum 12 and are secured to said drum and to the leg-forming bars 11, said plates however being free of connection with said pan. These plates are disposed in planes extending outwardly (substantially radially) from the lantern globe 15, and at the upper ends of said plates, notches 17 are formed in the bottom of the drum 12, so that insects crawling up said plates may enter said drum, either through the notches 17 or through the opening 13.

Additional vertical plates 18 extend between the pan 5 and the drum 12, being preferably integral with the outer edges of the plates 16. The plates 18 are substantially at right angles to the plates 16 and are secured at their upper ends to the drum 12, their lower ends however being free of attachment to the pan 5. These plates 18 form additional means for guiding the insects. If they crawl upwardly upon the plates 16 or 18, they enter the drum 12 and are burned to death. If they crawl downwardly upon said plates, they fall into the liquid contained in the pan 5 and are thus drowned.

Preferably, all of the plates 16 and 18 are provided with reflecting surfaces which serve to effectively blind the insects so that there is little danger of any of them escaping.

The pan 5 collects all insects which have been attracted by the lantern and killed and whenever the dead insects are to be discharged, the legs 11 may be withdrawn from the sockets 9 and the lantern 8 removed from the pan 5. These operations may also be carried out should it be necessary to replenish the supply of liquid in the pan 5, and whenever it is necessary to fill the lantern fuel pot 7.

It will be seen from the foregoing that a novel device has been provided for carrying out the objects of the invention, and attention is again invited to the fact that within the scope of said invention as claimed, variations may be made.

I claim:—

1. An insect exterminator comprising a lantern having a fuel pot and a globe, an open-top liquid-containing pan receiving said fuel pot and of greater diameter than the same to allow insects to descend into said pan, a drum over the upper end of the lantern having an opening in its bottom of greater diameter than said upper end of the lantern to allow insects to enter and fall from said drum, said drum being closed with the exception of said opening, and a plurality of plates extending vertically between said pan and drum and adapted to guide the insects into either said pan or drum.

2. An insect exterminator comprising a lantern having a fuel pot and a globe, an open-top liquid-containing pan receiving said fuel pot and of greater diameter than the same to allow insects to descend into said pan, a drum over the upper end of the lantern having an opening in its bottom of greater diameter than said upper end of the lantern to allow insects to enter and fall from said drum, a plurality of plates extending vertically between said pan and said drum and disposed in planes extending outwardly from the lantern globe and additional vertical plates projecting from the outer edges of the first named plates and disposed at an angle thereto, said plates being adapted to guide the insects into either said pan or said drum.

3. A structure as specified in claim 1; said plates having reflecting surfaces to blind the insects.

4. A structure as specified in claim 2; said plates having reflecting surfaces to blind the insects.

5. An insect exterminator comprising a lantern having a fuel pot and a globe, an open-top liquid-containing pan receiving said fuel pot and of greater diameter than the same to allow insects to descend into said pan, a drum over the upper end of the lantern having an opening in its bottom of greater diameter than said upper end of the lantern to allow insects to enter and fall from said drum, supporting legs for said drum having detachable connections with said pan, plates extending vertically from said pan to said drum, said plates being secured to said legs and drum and disposed in planes extending outwardly from the lantern globe, and additional vertical plates projecting from the outer edges of the first named plates and disposed at an angle thereto, said additional plates being secured to the first named plates and to said drum, all of said plates being adapted to guide the insects into either the drum or the pan.

In testimony whereof I affix my signature.

RALPH WATSON.